United States Patent Office 2,864,852
Patented Dec. 16, 1958

2,864,852

ACYLATED KETO ESTERS AND KETO NITRILES

Reuben G. Jones, Indianapolis, Ind., assignor to Eli Lilly and Company, Indianapolis, Ind., a corporation of Indiana No Drawing. Application February 2, 1955
Serial No. 485,814

12 Claims. (Cl. 260—465.4)

This invention relates to certain novel 1,4-dicarbonyl compounds having a carbalkoxy group or a cyano group in the 2-position, and processes for their preparation. More particularly, it relates to a process whereby gamma-carbonyl esters or nitriles are acylated on the carbon atom in the position alpha with respect to the ester or nitrile group, to produce 1,2,4-substituted 1,4-dicarbonyl alkanes.

It has been long known that it is possible to acylate gamma-carbonyl esters or nitriles on a methylene group adjacent to the gamma-carbonyl group in the presence of alkali. These acylations, when successful, produce substituted 1,3-dicarbonyl compounds which while useful cannot be cyclized to form 5- or 6-membered heterocyclic compounds containing but a single heteroatom. When vigorous acylation means known to the art to be operative in other cases are utilized in an effort to bring about acylation on the methylene group alpha to the carbalkoxy or cyano group, an intractable mixture of compounds is obtained, from which no useful product can be isolated.

I have now discovered a method whereby gamma-carbonyl esters or nitriles having the formula $$Y\text{---}R\text{---}CH_n\text{---}CH_2\text{---}X$$

wherein Y represents hydrogen, an alkyl radical, or a lower carbalkoxy group; R represents a covered carbonyl group; $n$ is an integer from 1 to 2; and X is a lower carbalkoxy group or a cyano group, can be acylated exclusively on the alpha methylene group to yield hitherto unobtainable 2-carbalkoxy or 2-cyano substituted 1,4-dicarbonyl compounds. Broadly, my invention comprises a process by which a gamma-carbonyl ester or nitrile having the gamma-carbonyl group thereof covered by means of formation thereon of a ketal or an enol ether grouping is acylated under basic conditions with an ester free from alpha-carbon-attached hydrogen. The resulting acylated compound can then be treated with acid to remove the covering group on the gamma-carbonyl group, thus forming the corresponding 2-carbalkoxy or 2-cyano substituted 1,4-dicarbonyl compound which is isolated and utilized as such. However, for many further synthetic reactions, particularly those employing acidic conditions, the covered carbonyl group in the 4-position is the full equivalent of a free carbonyl group and can be used in further synthetic reactions without removal of the covering group.

The process I have invented can be represented graphically by the following equation:

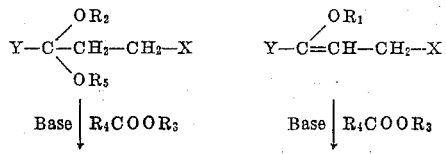

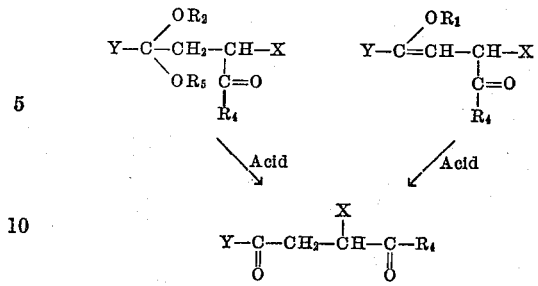

wherein Y and X have the same significance as hereinbefore; $R_1$ and $R_3$ represent the same or different lower alkyl radicals; $R_2$ and $R_5$ represent a lower alkyl radical or both $R_2$ and $R_5$, taken together, form an alkylene chain containing two or three carbon atoms; and $R_4$ represents an organic grouping free from alpha-carbon-attached hydrogen.

The starting materials useful in my process are esters or nitriles containing a covered gamma-carbonyl group. These protected gamma-carbonyl esters or nitriles are prepared from gamma-carbonyl compounds containing the ester or nitrile grouping. This gamma-carbonyl ester or nitrile bears a substituent in the gamma position represented as "Y" in the above equation, which can be hydrogen, a lower carbalkoxy group, or an alkyl group. Where the gamma-carbonyl ester or nitrile is substituted in the gamma position by hydrogen, illustrative compounds are ethyl 4-aldehydo butyrate or 3-cyano propionaldehyde. Diethyl $\alpha$-keto glutarate is exemplary of a compound wherein the gamma substituent of the gamma-carbonyl ester or nitrile is a lower carbalkoxy group. Examples of compounds containing the gamma-carbonyl ester or nitrile substituted by an alkyl group in the gamma position are: ethyl levulinate (ethyl gamma-keto valerate), ethyl gamma-keto hexanoate, methyl gamma-keto octanoate, propyl gamma-keto nonanoate, ethyl gamma-keto decanoate, ethyl ricinate (ethyl gamma-keto stearate), and the like. The alkyl groups can also be substituted by an aromatic radical such as phenyl or thenyl, as for example, ethyl delta-phenyl levulinate.

Inasmuch as the group which is a gamma substituent of the gamma-carbonyl ester or nitrile grouping does not enter into any reaction of my novel process, a wide range of substituents is permissible. For example, in addition to the groups disclosed above, saturated and unsaturated carbocyclic and heterocyclic groups can be gamma substituents. The sole proviso is that the group substituted on the gamma-carbonyl group be free from a tendency to interfere with, or to inhibit, the various reactions. However, groups attached to the gamma-carbonyl which are affected by the acidic or basic reaction conditions do not necessarily interfere with my novel acylation process, although such substituent may be changed thereby.

Gamma-carbonyl esters and nitriles such as the above are transformed into starting materials for my novel process by introducing a covering group on the gamma-carbonyl group. This covering or protective group converts the carbonyl group to a ketal or an enol ether grouping.

To form a covering ketal grouping on the gamma-carbonyl group, the gamma-carbonyl ester or nitrile is reacted under acidic conditions with an alkanol such as methanol, ethanol, or propanol, or a glycol such as ethylene glycol or trimethylene glycol, or a carrier for an alkanol such as a lower alkyl ortho ester. The resultant ketal is then purified as by distillation in vacuo. To obtain a uniform product, it is necessary to neutralize the acidic reaction mixture prior to distillation and to distill the mixture at a pressure of below about 10 mm. of mercury. Illustratively, by the above method, ethyl levulinate plus ethanol yields ethyl levulinate diethyl ketal, ethyl levulinate plus ethylene glycol yields ethyl levulinate ethylene ketal, diethyl α-keto glutarate plus ethanol yields diethyl α,α-diethoxy glutarate, ethyl levulinate plus ethyl ortho formate yields ethyl levulinate diethyl ketal, and ethyl gamma-aldehydo butyrate plus trimethylene glycol yields ethyl gamma-aldehydo butyrate trimethylene acetal. Other gamma-carbonyl esters or nitriles in which the gamma-carbonyl group is protected by conversion to a ketal can be prepared in a similar manner.

An alternative method of forming the gamma-carbonyl esters or nitriles in which the gamma-carbonyl group is covered by ketal formation thereon is to employ a ketal in the synthesis of the ester or nitrile. For example, acrolein diethyl ketal is reacted with hydrogen cyanide to form 4,4-diethoxy butyronitrile. Hydrolysis of this nitrile with aqueous base followed by esterification with ethanol yields ethyl 4,4-diethoxy butyrate. If desired, other covered gamma-carbonyl esters or nitriles can be prepared in a like manner.

To form a covering enol ether grouping on the gamma-carbonyl group, the selected gamma-carbonyl ester or nitrile is reacted with an aliphatic alcohol in the presence of a strongly acidic catalyst such as sulfuric acid or p-toluene sulfonic acid. For example, one equivalent each of ethanol and ethyl levulinate in benzene solution are reacted in the presence of a catalytic amount of p-toluene sulfonic acid whereby there is produced ethyl 4-ethoxy-3-pentenoate. By the same methods there can be prepared from methanol and propyl levulinate, propyl 4-methoxy-3-pentenoate, and so forth.

In the formation of the covering enol ether grouping as above, a double bond is formed between the carbonyl group and a methylene group adjacent thereto. If there are two adjacent methylene groups in the starting ester, a mixture of double bond isomers of the enol ether grouping will obviously result. For example, the reaction of ethyl ortho formate with ethyl 4-keto heptanoate in the presence of strong acid yields a mixture of ethyl 4-ethoxy-3-heptenoate and ethyl 4-ethoxy-4-heptenoate.

Another useful method for preparation of a covering enol ether grouping on the gamma-carbonyl group of a gamma-carbonyl ester or nitrile involves the heating of a ketal of a gamma-carbonyl ester or nitrile in the presence of an acidic catalyst. Thus, distillation of ethyl levulinate diethyl ketal at atmospheric pressure in the presence of catalytic quantities of sulfuric acid gives ethyl 4-ethoxy-3-pentenoate in excellent yield. In the same way methyl gamma-keto heptanoate diethyl ketal distilled at atmospheric pressure in the presence of a catalytic amount of p-toluene sulfonic acid yields a mixture of methyl 4-ethoxy-4-heptenoate and methyl 4-ethoxy-3-heptenoate.

As previously stated, my novel process comprises the acylation of gamma-carbonyl ester or nitrile having a covered gamma-carbonyl group solely on the methylene group adjacent to the ester or nitrile group. The acylating reactant can be represented by the structure $R_4COOR_3$ in which $R_4$ represents hydrogen or an organic residue free from alpha-carbon attached hydrogen and $R_3$ represents a lower alkyl radical. Thus, $R_4$ can be a hydrogen atom, an aromatic radical, a carbalkoxy group, or a tertiary aliphatic radical with the tertiary carbon attached directly to the ester grouping. $R_3$ can be a lower alkyl group, as for example methyl, ethyl, propyl, and the like. When $R_4$ is a hydrogen atom or a carbalkoxy group, the reacting ester compound $R_4COOR_3$ becomes, respectively, an ester of formic acid or a diester of oxalic acid. When $R_4$ is an aromatic radical, it can either be a carbocyclic or a heterocyclic radical, as for example a thenyl radical, a phenyl radical, an α- or β-naphthyl radical, an α-, β-, or gamma-pyridyl radical, and the like. Additionally, $R_4$ can be represented by any of the above aromatic radicals when these are substituted by groups such as alkyl groups, ethoxy groups, halogen atoms, and the like. Illustrative examples of the reacting ester compound when $R_4$ is an aromatic radical and $R_3$ a lower alkyl group are: ethyl furoate, methyl benzoate, ethyl toluate, ethyl nicotinate, ethyl isonicotinate, ethyl picolinate, methyl α-naphthoate, ethyl paramethoxy benzoate, and the like.

Examples of the reactive ester compound $R_4COOR_3$ when $R_4$ is a tertiary aliphatic radical and $R_3$ is a lower alkyl group are: ethyl trimethylacetate, ethyl α,α-dimethyl butyrate, and methyl α-methyl cyclohexane carboxylate.

The requirement that the alpha-carbon of the reacting ester compound be free from hydrogen provides that there will be no by-product formation arising out of self-condensation of the reacting ester compound under the reaction conditions of the acylation step. For example, ethyl acetate, a compound with three alpha-attached hydrogen atoms, undergoes self-condensation in the presence of a Claisen-type condensing agent, to form ethyl acetoacetate. While ethyl acetate would also acylate the alpha-carbon atom of a gamma-carbonyl ester or nitrile having a covered gamma-carbonyl group, the presence in the reaction mixture of ethyl acetoacetate would make purification difficult, and for this reason I have restricted my invention so as to exclude reacting esters which can self-condense under the reaction conditions.

The reaction conditions under which the covered gamma-carbonyl ester or nitrile is acylated on the carbon atom alpha to the ester or nitrile group with an ester represented by the formula $R_4COOR_3$ are those commonly used in carrying out a Claisen-type condensation. These reaction conditions are customarily the use of an alkali metal alkoxide as a condensing agent in an inert solvent or an anhydrous alcohol. It is well within the art of a skilled chemist to employ other equivalent condensing agents and reaction conditions which are also employed in Claisen-type condensations. A description of some of these other methods is contained in Organic Reactions, vol. 1, page 276 et seq., Wiley, 1942. As exemplified thereby it is well known that Claisen-type condensing agents include finely dispersed sodium, purified alkali metal alkoxides, triphenylmethyl sodium, mesityl magnesium bromide, potassium amide, potassium t-butoxide, and the like, and the term "Claisen-type condensing agents," as used herein, is to be understood as defining such substances generically.

Alternatively, my novel process can be carried out to the restoration of the original gamma-carbonyl group of the now acylated gamma-carbonyl compound by removal of its protective covering elements. This removal can be effected when desirable by treatment of the alpha-acylated protected gamma-carbonyl ester or nitrile with a catalytic amount of strong acid. This acidic treatment can be performed with the isolated and purified ketal or enol ether of the alpha-acylated protected gamma-carbonyl ester or nitrile, or more advantageously, the removal of the covering groups can be accomplished at some stage prior to purification, for example, by treatment of the impure compound with aqueous acid. However, removal of the covering elements from the gamma-carbonyl group in a separate reaction step is not necessary when the covered gamma-carbonyl compound is to be used as an intermediate in cyclization reactions which are carried out under acidic conditions. As with the case of the unacylated covered gamma-carbonyl esters or nitriles, it is frequently convenient to convert a ketal group to an enol ether group in the acylated covered gamma-carbonyl ester or nitrile. This conversion can be accomplished as described in the above case of the unacylated covered gamma-carbonyl ester or nitrile, by distillation at pressures from 10 mm. of mercury upwards to atmospheric in the presence of an acidic catalyst.

For convenience throughout the following disclosure, and specific examples, ethanol is used as a reactant and all alkoxides or esters or ketals or enol ethers are also derived from ethanol, but the illustrative use of ethanol and ethyl radicals in this fashion should not be construed as limiting the invention in any way since other alcohols, ester groups, and ether groups are equally operative, as disclosed hereinabove.

In carrying out my novel process of acylation, a solution of an alkali metal alkoxide is first prepared. Preferably, one equivalent of sodium is added to about one-fifth of an equivalent of an alkanol in an inert solvent, thus preparing about one-fifth of an equivalent of a sodium alkoxide, the remainder of the sodium remaining undissolved. It is not necessary to add a full equivalent of the alkanol since about one equivalent of alkanol is split off from the reactants during the reaction, thus furnishing more than sufficient alkanol to react completely with the sodium. To the mixture containing sodium and sodium alkoxide in an inert solvent solution is added a mixture containing both the covered gamma-carbonyl ester or nitrile and a reactive ester free from alpha-carbon-attached hydrogen. The reaction customarily is carried out within the temperature range of from about 5° C. upwards to about 50° C., although higher temperatures can be employed. After addition of the reactants is complete, the reaction mixture is allowed to stand at room temperature overnight whereupon the acylation is substantially completed. To recover the product, the reaction mixture is diluted with water and washed with ether. The ether washings contain unconverted starting materials which can be recovered, as by distillation. The aqueous residue contains, as a sodium salt, the new alpha-acylated ester or nitrile which still possesses a covered gamma-carbonyl group. The aqueous phase is then acidified with strong acid which, after a short period of standing removes the covering ketal or enol ether group, and thereby restores the original gamma-carbonyl group. The substituted alpha acyl gamma-carbonyl ester or nitrile can then be purified by conventional means, as by distillation.

A preferred method of carrying out the process I have invented is as follows:

1.1 mol. of sodium are suspended in about 1 l. of anhydrous ether and about 0.2 mol. of anhydrous ethanol added thereto, thus forming about 0.2 mol. of sodium ethoxide. To the stirred reaction mixture is added a mixture containing about one mol. of the selected covered gamma-carbonyl ester or nitrile and about 1.2 mol. of the selected reactive ester compound. Only a small part of this mixture is added until the reaction is seen to proceed. The remainder of the mixture is then run into the reaction mixture during a period of about one hour. The reaction mixture is allowed to stand overnight at room temperature. It is then cooled in an ice bath and about 400 ml. of ice water are added cautiously while vigorous stirring is maintained. The ether layer is separated and the aqueous layer washed with about 200 ml. more of ether. The combined ether washings are dried and distilled in order to recover any unconverted gamma-carbonyl ester or nitrile.

Immediately after separation of the aqueous layer from the ether wash the aqueous layer is treated with about 100 ml. of concentrated hydrochloric acid. After allowing this mixture to stand for a few minutes, ether extraction is carried out with four 100 ml. portions of ether. These ether extracts are combined, dried, and evaporated to dryness, leaving an oily residue of alpha-acylated gamma-carbonyl ester or nitrile. This residue is then purified by distillation in high vacuum.

For purposes of illustration, the following table lists representative starting materials and the products which can be procured from combinations thereof according to the processes described herein.

TABLE I

| Covered Gamma-Carbonyl Ester or Nitrile | Reactive Ester | Final Product |
|---|---|---|
| Ethyl 4-ethoxy-3-pentenoate. | Ethyl formate | Ethyl 2-formyl-4-keto valerate. |
| Do | Diethyl oxalate | Ethyl 2-ethoxalyl-4-keto valerate. |
| 4,4-diethoxy butyronitrile. | do | 2-ethoxalyl-4-ethoxy-3-butenonitrile. |
| Diethyl α,α-diethoxyglutarate. | do | Diethyl α,α-diethoxy-α'-ethoxalyl glutarate. |
| Do | Ethyl formate | Diethyl α,α-diethoxy-α'-formyl glutarate. |
| 4,4-diethoxy butyronitrile. | do | 4,4-diethoxy 2-formyl butyronitrile. |
| Ethyl levulinate diethyl ketal. | do | 2-carboethoxy pentan-1,4-dione. |
| Propyl 4,4-diethoxy hexanoate. | Ethyl benzoate | Propyl 2-benzoyl-4-keto hexanoate. |
| Methyl 4-ketoheptanoate ethylene ketal. | Ethyl nicontinate | Methyl 2-nicotinoyl 4-keto heptanoate. |
| Ethyl 4,4-diethoxy butyrate. | Ethyl formate | Ethyl 2-formyl 4,4-diethoxy butyrate. |
| Ethyl 4-ethoxy-3-butenoate. | Diethyl oxalate | Ethyl 2-ethoxalyl-4-ketobutyrate. |
| Ethyl levulinate diethyl ketal. | Ethyl-α-furoate | Ethyl 2-α-furoyl 4-keto valerate. |
| Methyl levulinate dimethyl ketal. | Dimethyl oxalate | Methyl 2-methoxalyl-4-methoxy-3-pentenoate. |
| Methyl 4-methoxy-3-pentenoate. | Methyl formate | Methyl 2-formyl-4-methoxy-3-pentenoate. |
| 4,4-dimethoxy butyronitrile. | Methyl thiopheno-2-carboxylate. | 2-α-thenoyl-4,4-dimethoxy butyronitrile. |
| 2-(2'-cyanoethyl)-1,3-dioxolane. | Ethyl p-chlorobenzoate. | 2-(2'-(p-chlorobenzoyl)-2'-cyanoethyl)-1,3-dioxolane. |
| Dimethyl α,α-dimethoxy glutarate. | Methyl isonicotinate. | Dimethyl α,α-dimethoxy-α'-isonicotinoyl glutarate. |
| Diethyl α-keto glutarate ethylene ketal. | Ethyl p-toluate | Diethyl α-keto-α'-(p-toluyl) glutarate. |
| Diethyl α,α-diethoxy glutarate. | Ethyl trimethyl acetate. | Diethyl α-keto-α'-trimethyl acetyl glutarate. |
| Ethyl levulinate propylene ketal. | Ethyl trimethyl acetate. | Ethyl 2-trimethyl acetyl 4-keto valerate. |

The substituted 2-carbalkoxy or 2-cyano-1,4-diketo compounds or the ketals or enol ethers convertible thereto, as made by my novel process and as illustrated above, are useful intermediates in the synthesis of 5- and 6-membered heterocyclic compounds. Thus, the above 1,4-diketo compounds or compounds convertible thereto, when these contain a total of one or two carbalkoxy or nitrile groups, are transformed by the action of strong acid to substituted furans, by the action of phosphorus pentasulfide to substituted thiophenes, and by the action of ammonia or of a primary amine, followed by acid if necessary, to substituted pyrroles. Similarly, 1,4-dicarbonyl compounds or compounds convertible thereto, when these contain carbalkoxy or nitrile groups substituted in the 3-position, are transformed by treatment with strong acid to substituted α-keto pyrans.

The heterocyclic compounds formed by the above procedures can be further transformed to other useful products by chemical processes well known to the art. For example, treatment with alkali of carbalkoxy or cyano substituted furans, thiophenes, or pyrroles as formed by the above methods, yield mono- or di-carboxylic acids of furan, thiophene, or pyrrole hitherto obtainable only with difficulty. By way of illustration of the use to which compounds produced by my process can be put, is the following: Ethyl 2-ethoxalyl 4,4-diethoxy valerate, ethyl 2-ethoxalyl 4-keto valerate or ethyl 2-ethoxalyl 4-ethoxy-3-pentenoate can be transformed by treatment with phosphorus pentasulfide to a substituted thiophene, which upon hydrolysis with alkali yields 5-methyl thiophene 2,3-dicarboxylic acid. This compound can be transformed into a dinitrile and thence into a dyestuff of the phthalocyanine type by the method of Linstead et al., J. C. S. 911 (1937). Another example of the use to which my novel compounds can be put is the ring closure of 2-ethoxalyl 4,4-diethoxy butyronitrile under strongly acid conditions to yield 2-carbethoxy-3-cyano furan. Alkaline hydrolysis of this compound yields furan 2,3-dicarboxylic acid which can be partially decarboxylated by heat to furoic acid, a useful bactericide and intermediate for other bactericides, and which can be fully decarboxylated by heating at higher temperatures to furan, a useful solvent.

This invention is further illustrated by the following specific examples:

Example 1
PREPARATION OF ETHYL LEVULINATE DIETHYL KETAL

To a mixture of 144 g. of ethyl levulinate, 50 g. of absolute ethanol and 165 g. of ethyl ortho formate were added 10 drops of concentrated sulfuric acid. After a few minutes the mixture became warm. It was allowed to stand overnight at room temperature. 3 ml. of triethanolamine were added and the resulting mixture was heated on the steam bath at about 100° C. to remove ethyl formate and ethanol. The residue comprising ethyl levulinate diethyl ketal was distilled under reduced pressure. A yield of 206 g. (94.5 percent based on ethyl levulinate) of ethyl levulinate diethyl ketal was obtained. It is a colorless liquid, boiling at about 98° C. to 100° C. at a pressure of about 7 mm. of mercury.

*Analysis.*—Calc'd for $C_{11}H_{22}O_4$: C, 60.50; H, 10.16. Found: C, 60.27; H, 10.21. Refractive index: $n_D^{25}=1.4219$; density:

$$d_{25}^{25}=0.9600$$

When the acid catalyst present in the reaction mixture was not neutralized, or when the distillation was carried out above a pressure of about 10 mm. of mercury, decomposition took place with the formation of ethyl 4-ethoxy-3-pentenoate.

Example 2
PREPARATION OF ETHYL 4-ETHOXY-3-PENTENOATE

The procedure of Example 1 was repeated using the same quantities of material and under identical conditions except that the mixture was heated at about 100° C. overnight. The resulting solution was distilled under atmospheric pressure until the temperature of the distillate reached 100° C. Distillation of the residue was continued under reduced pressure through a Vigreux column. In this way a 120 g. fraction of ethyl 4-ethoxy-3-pentenoate was collected between 79° C. to 82° C. at a pressure of 7 mm. of mercury, and a 42 g. fraction, which was a mixture of ethyl 4-ethoxy-3-pentenoate and ethyl levulinate diethyl ketal, was collected between 82° C. to 100° C. at the same pressure. After adding thereto three drops of concentrated sulfuric acid, the latter fraction was heated for three hours on the steam bath. Upon redistillation of this fraction, a distillate amounting to 30 g. and boiling in the range of 79° C. to 83° C. at a pressure of 7 mm. of mercury was collected, making the total yield of ethyl 4-ethoxy-3-pentenoate 150 g., or 87 percent based upon ethyl levulinate. A portion of this fraction was redistilled.

*Analysis.*—Calc'd for $C_8H_{16}O_3$: C, 62.76; H, 9.36. Found: C, 62.45; H, 9.36. Refractive index: $n_D^{25}=1.4316$; density:

$$d_{25}^{25}=0.9612$$

Example 3
PREPARATION OF DIETHYL α,α-DIETHOXY GLUTARATE

A mixture of 370 g. of diethyl α-keto glutarate, 295 g. of ethyl ortho formate, and 70 g. of anhydrous ethanol was treated with 5 ml. of concentrated sulfuric acid. The mixture was allowed to stand overnight at room temperature and was then heated on the steam bath at about 100° C. for four hours during which time ethyl formate and ethanol were allowed to evaporate. The resulting residue comprising diethyl α,α-diethoxy glutarate was cooled and was then washed with 200 ml. of a cold saturated sodium carbonate solution. The diethyl α,α-diethoxy glutarate was dried and was distilled under reduced pressure. 445 g. of diethyl α,α-diethoxy glutarate, representing an 88 percent yield based on diethyl α-keto glutarate, were obtained by collecting the fraction boiling in the range of 140° C. to 145° C. at a pressure of about 7 mm. of mercury.

*Analysis.*—Calc'd for $C_{13}H_{24}O_6$: C, 56.50; H, 8.76. Found: C, 56.35; H, 8.50. Refractive index: $n_D^{25}=1.1430$; density:

$$d_{25}^{25}=1.055$$

Example 4
PREPARATION OF ETHYL 2-FORMYL-4-KETO VALERATE

A mixture of 500 ml. of dry ether and 5 ml. of anhydrous ethanol was prepared in a dry 1 l., 3-necked flask fitted with a stirrer, dropping funnel, and reflux condenser. To this solution was added 13 g. of metallic sodium previously cut into small pieces. After all of the ethanol had reacted to form sodium ethoxide, 20 ml. of a mixture of 86 g. of ethyl 4-ethoxy-3-pentenoate and 45 g. of ethyl formate was added with stirring. After the reaction had started, the remainder of the mixture was added over a period of about one hour. The resulting brown solution which contained ethyl 2-formyl-4-ethoxy-3-pentenoate was allowed to stand overnight. The solution was then cooled in an ice bath and 200 ml. of ice water was added cautiously from a dropping funnel while vigorous stirring was maintained. The ether and aqueous layers were separated and the aqueous layer was washed with 100 ml. of ether. The combined ether layers were dried and the ether evaporated in vacuo. Upon distillation of the residual liquid, 30 g. of one of the starting materials, ethyl 4-ethoxy-3-pentenoate, was recovered.

Immediately after separation from the ether layer, the aqueous layer was acidified with 50 ml. of concentrated hydrochloric acid in order to convert ethyl 2-formyl-4-ethoxy-3-pentenoate to ethyl 2-formyl-4-keto valerate. This conversion was complete after a few minutes, whereupon the mixture was extracted with four 100 ml. portions of ether. The ether extracts were combined, were dried with anhydrous magnesium sulfate, and were evaporated in vacuo. The resulting residue, comprising ethyl 2-formyl-4-keto valerate weighed about 45 g. and was a brownish oil. Distillation of this oil gave 34 g. of a fraction boiling between 100° C. to 120° C. at a pressure of about 1 mm. of mercury. Redistillation of this fraction yielded 30 g. of ethyl 2-formyl-4-keto valerate boiling between about 83° C. to 86° C. at a pressure of 0.1 mm. of mercury.

*Analysis.*—Calc'd for $C_8H_{12}O_4$: C, 55.80; H, 7.03. Found: C, 55.93; H, 6.78. Refractive index: $n_D^{25}=1.4525$; density:

$$d_{25}^{25}=1.156$$

The above experiment was carried out using 109 g. of ethyl levulinate diethyl ketal in place of 86 g. of ethyl 4-ethoxy-3-pentenoate. 48 g. of starting ketal were recovered. The yield of ethyl 2-formyl-4-keto valerate was 25 g.

Example 5
ETHYL 2-ETHOXALYL-4-KETO VALERATE

A reaction procedure was carried out in the same manner as that of Example 4 except that 75 g. of ethyl oxalate were used in place of the ethyl formate used in that example. 15 g. of starting ethyl 4-ethoxy-3-pentenoate were recovered. The yield of ethyl 2-ethoxalyl-4-keto valerate after two distillations was 50 g.

*Analysis.*—Calc'd for $C_{11}H_{16}O_6$: C, 54.09; H, 6.60.

Found: C, 54.21; H, 6.68. Refractive index: $n_D^{25}$=1.450; density:

$$d_{25}^{25}=1.45$$

The same procedure was carried out using ½ mol. of ethyl levulinate diethyl ketal in place of ethyl 4-ethoxy-3-pentenoate. Nineteen percent of starting ketal was recovered. Ethyl 2-ethoxalyl levulinate diethyl ketal was formed as an intermediate and was transformed by treatment with aqueous acid into ethyl 2-ethoxalyl-4-keto valerate. The overall yield was 30 percent.

*Example 6*

PREPARATION OF DIETHYL α,α-DIETHOXY-α'-ETH-OXALYL GLUTARATE 1 l. of dry ether and 23 g. of sodium shot were placed in a 3 l., 3-necked flask provided with a stirrer, dropping funnel, and reflux condenser. 10 ml. of anhydrous ethanol were added. When the anhydrous ethanol had reacted to form sodium ethoxide, a mixture of 276 g. of diethyl α,α-diethoxy glutarate and 160 g. of ethyl oxalate were added with stirring over a period of three hours. The reaction mixture containing diethyl α,α-diethoxy-α'-ethoxalyl glutarate was allowed to stand at room temperature for two days. 1,500 ml. of ice water were added and the ether layer was separated. The aqueous layer was washed with 200 ml. of ether to recover unchanged starting material, the combined ether layers were dried, the ether evaporated, and the residue distilled to yield 60 g. of diethyl α,α-diethoxy glutarate. The aqueous layer was acidified quickly with cold dilute sulfuric acid. A brown oil separated which was extracted into ether. After drying the ether extract, the ether was evaporated under reduced pressure, leaving 265 g. of crude diethyl α,α-diethoxy-α'-ethoxalyl glutarate.

The procedure set forth hereinabove was repeated, except that ethyl formate was used in place of ethyl oxalate. A 60 percent yield of crude diethyl α,α-diethoxy-α'-formyl glutarate was obtained.

Because of the extensive decomposition which ensued upon distillation, no attempt was made to purify further either of these substituted diesters of glutaric acid. Both of the diesters were cyclized by the action of sulfuric acid to form substituted furans or pyrans.

*Example 7*

PREPARATION OF 2-ETHOXALYL-4,4-DIETHOXY BUTYRONITRILE AND OF 2-ETHOXALYL-4-ETHOXY BUTENONITRILE

Following the method of Example 6, sodium ethoxide was prepared from 12 g. of sodium shot and 25 g. of anhydrous ethanol in 400 ml. of anhydrous ether. After most of the sodium had reacted, 75 g. of ethyl oxalate were added dropwise. To this solution was then added 79 g. of 4,4-diethoxy butyronitrile prepared by the method of Wohl, Ber. 39, 1952 (1906). The reaction flask was stoppered and allowed to stand at room temperature for three days. The resulting brown solution containing 2-ethoxalyl-4,4-diethoxy butyronitrile was poured with stirring into 1 l. of ice water. The water layer was washed with several 200 ml. portions of ether. To recover starting material, the combined ether washings were dried, and the ether evaporated. Fractional distillation of the residue yielded 27 g. of 4,4-diethoxy butyronitrile. The ether-washed, brown aqueous layer was acidified with 100 ml. of cold 6 N sulfuric acid and was immediately extracted with three 100 ml. portions of ether. The combined ether extracts were dried and the ether evaporated, leaving 70 g. of crude 2-ethoxalyl-4,4-diethoxy butyronitrile as a brown oil. Distillation of this oil yielded a major fraction boiling at about 140° C. to 145° C. at a pressure of 1 mm. of mercury. Redistillation of this fraction gave 49 g. of 2-ethoxalyl-4-ethoxy butenonitrile.

*Analysis.*—Calc'd for $C_{10}H_{13}NO_4$: C, 56.86; H, 6.20; N, 6.63. Found: C, 56.80; H, 6.44; N, 6.91. Refractive index: $n_D^{25}$=1.4770; density:

$$d_{25}^{25}=1.31$$

2-ethoxalyl-4-ethoxy butenonitrile is converted to 2-ethoxalyl-4-aldehydo butyronitrile by treatment with aqueous acid for a few minutes followed by purification and distillation.

The procedure of this example illustrates the conversion of an acetal to an enol ether by distillation in the presence of a trace of acid. It should be noted that this conversion is equally operative both before and after condensation on the alpha-carbon atom with ethyl oxalate, ethyl formate, and the like.

I claim:

1. A compound represented by the formula

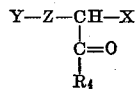

wherein Y represents a member of the group consisting of a hydrogen atom, a lower carbalkoxy group, and an alkyl radical having from 1 to 12 carbon atoms; X represents a member of the group consisting of a lower carbalkoxy radical and a cyano radical; Z represents a member of the group consisting of

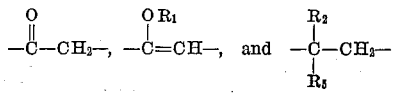

wherein $R_1$ represents a lower alkyl group, and $R_2$ and $R_5$ when taken singly represent lower alkoxy radicals and when taken together with the carbon atom to which they are attached represent a member of the group consisting of 1,3-dioxans and 1,3-dioxolanes; and $R_4$ represents a member of the class consisting of hydrogen, a lower carbalkoxy group, a tertiary alkyl radical containing from 4 to 8 carbon atoms having a tertiary carbon atom attached directly to the carbonyl group carrying the $R_4$ group, and phenyl, naphthyl, thenyl and pyridyl and their lower alkoxy and halogen substitution products.

2. A compound represented by the formula

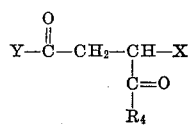

wherein Y represents a member of the group consisting of a hydrogen atom, a lower carbalkoxy group, and an alkyl radical having from 1 to 12 carbon atoms; X represents a member of the group consisting of a lower carbalkoxy radical and a cyano radical; and $R_4$ represents a member of the class consisting of hydrogen, a lower carbalkoxy group, a tertiary alkyl radical containing from 4 to 8 carbon atoms having a tertiary carbon atom attached directly to the carbonyl group carrying the $R_4$ group, and phenyl, naphthyl, thenyl and pyridyl and their lower alkoxy and halogen substitution products.

3. A compound represented by the formula

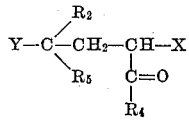

wherein Y represents a member of the group consisting of a hydrogen atom, a lower carbalkoxy group, and an alkyl radical having from 1 to 12 carbon atoms; X represents a member of the group consisting of a lower carbalkoxy radical and a cyano radical; $R_2$ and $R_5$ when taken singly represent lower alkoxy radicals and when taken together with the carbon atom to which they are attached a member of the group consisting of 1,3-dioxans and 1,3-dioxolanes; and $R_4$ represents a member of the class consisting of hydrogen, a lower carbalkoxy group and a tertiary alkyl radical containing from 4 to 8 carbon atoms having a tertiary carbon atom attached directly to the carbonyl group carrying the R₄ group, and phenyl, naphthyl, thenyl and pyridyl and their lower alkoxy and halogen substitution products.

4. A compound represented by the formula

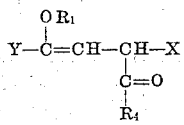

wherein Y represents a member of the group consisting of a hydrogen atom, a lower carbalkoxy group, and an alkyl radical having from 1 to 12 carbon atoms; X represents a member of the group consisting of a lower carbalkoxy radical and a cyano radical; R₁ represents a lower alkyl group; and R₄ represents a member of the class consisting of hydrogen, a lower carbalkoxy group and a tertiary alkyl radical containing from 4 to 8 carbon atoms having a tertiary carbon atom attached directly to the carbonyl group carrying the R₄ group, and phenyl, naphthyl, thenyl and pyridyl and their lower alkoxy and halogen substitution products.

5. Ethyl 2-formyl-4-keto valerate.
6. Ethyl 2-ethoxalyl-4-keto valerate.
7. Diethyl α,α-diethoxy-α'-formyl glutarate.
8. Diethyl α,α-diethoxy-α'-ethoxalyl glutarate.
9. 2-ethoxalyl-4,4-diethoxy butyronitrile.
10. In the process for the preparation of substituted 1,4-dicarbonyl alkanes, the step which comprises acylating in the presence of a Claisen-type condensing agent a compound represented by the formula Y—R—CH$_n$—CH$_2$—X wherein Y represents a member of the group consisting of hydrogen, alkyl radicals containing from 1 to 12 carbon atoms, and lower carbalkoxy radicals; R represents a covered carbonyl group; $n$ is an integer from 1 to 2; and X represents a member of the group consisting of a lower carbalkoxy radical and a cyano radical, with an ester having the structure R₄COOR₃ wherein R₄ is chosen from the group consisting of hydrogen, a lower carbalkoxy group, a tertiary alkyl radical containing from 4 to 8 carbon atoms and having a tertiary carbon atom attached directly to the carbonyl group, and phenyl, naphthyl, thenyl and pyridyl and their lower alkoxy and halogen substitution products and R₃ as a lower alkyl group.

11. The process which comprises acylating a compound having the structure

Lower alkyl-OOC—R—CH$_n$—CH$_2$—COO-lower alkyl wherein R represents a covered carbonyl group and $n$ is an integer from 1 to 2; with a compound of the class consisting of lower alkyl esters of oxalic and formic acids in the presence of a Claisen-type condensing agent.

12. The process which comprises acylating a compound represented by the structure CH$_3$—R—CH$_n$—CH$_2$—COO-lower alkyl wherein R represents a covered carbonyl group and $n$ is an integer from 1 to 2; with a compound of the class consisting of lower alkyl esters of oxalic and formic acids in the presence of a Claisen-type condensing agent, and then reacting said acylated compound with aqueous acid.

References Cited in the file of this patent

UNITED STATES PATENTS

| | | |
|---|---|---|
| 2,436,130 | Weissberger et al. | Feb. 17, 1948 |
| 2,482,066 | Hull et al. | Sept. 13, 1949 |
| 2,745,845 | Jones et al. | May 15, 1956 |

OTHER REFERENCES

Fieser and Fieser: Org. Chemistry, 2nd ed., pp. 216–17 (1950).

Dann et al.: Ber. Deut. Chem., vol. 85, p. 457 (1952).

Wagner-Zook: Synthetic Organic Chemistry, p. 345 (1953).